United States Patent Office.

THOMAS WADE APPLEYARD, JR., AND WALTER KNAPP APPLEYARD, OF LEEDS, COUNTY OF YORK, AND JAMES LONGSHAW, OF MANCHESTER, COUNTY OF LANCASTER, ENGLAND.

PROCESS OF MAKING SOLUBLE BLACK FOR INKS.

SPECIFICATION forming part of Letters Patent No. 306,456, dated October 14, 1884.

Application filed December 11, 1883. (No specimens.) Patented in England June 6, 1883, No. 2,816.

*To all whom it may concern:*

Be it known that we, THOMAS WADE APPLEYARD, Jr., and WALTER KNAPP APPLEYARD, both of Leeds, in the county of York, and JAMES LONGSHAW, of Manchester, in the county of Lancaster, England, have invented certain new and useful Improvements in the Manufacture of Soluble Black, of which the following is a specification.

The object of our invention is to improve the production of the above-mentioned soluble black from spent tan materials, whereby we obtain a product which can be used as an ingredient in the manufacture of various articles now made, wherein a cheap soluble or partially-soluble black could be used and wholly or partially displace some of the more expensive agents now employed. As an example, we mention ordinary blacking.

It has long been known that an inferior kind of ink can be made by boiling down spent tan-liquors—that is, liquors out of which nearly all the tannin is already extracted—and treating with iron or ferruginous matters; but in practice all these attempts have been commercial failures, owing to the material having a strong acid reaction and largely precipitating in the process of boiling down. Now, we have discovered that if to the spent tan-liquor we add sufficient caustic alkali, or even caustic lime, to take up or neutralize all the gallic acid and other acids present in the solution, we get excellent results and little or no precipitate during the boiling. We prefer for this purpose caustic soda.

Our manner of operating is as follows: We add to the mixed tan materials or tan-liquor only sufficient caustic soda to combine chemically with all the acid matter present, whether in the liquid or in the solid spent material, and until after complete intermixture by any ordinary test the mixture is found to be slightly alkaline. If solid spent tan has been used, it must be well boiled with the caustic and liquor. We now filter or strain the liquor, so as to remove the insoluble refuse, then evaporate the liquid quickly by any suitable means to a density or specific gravity of from 40° to 70° Twaddle, the exact density depending upon the purpose to which it is afterward to be applied. We now add to this liquor green vitriol (ferrous sulphate) or other soluble salt of iron, (the more basic it is the better,) sufficient in amount for its acid to combine with nearly all the soda present, and expose it to the air to get the necessary amount of oxidation. The result is a thick, dense black product—the soluble black required. It is, in fact, a mixture of gallate of iron and salts of soda with extractive matter from tan products. If a ferric salt has been used, the desired blackness is obtained at once without oxidation or exposure to air. It would be possible to reverse the process—boil down first and then add the iron salt and the caustic—and the result would be a somewhat similar but inferior material; but it would be a very troublesome operation, owing to the precipitate that forms in boiling and the difficulty in again dissolving that precipitate, or of preventing it caking or burning while the liquor is being boiled down. One main point to be considered if the best results be desired is to add no more iron than the vegetable acids present in the liquor when free are capable of combining with, and to add only such quantity of caustic to the liquor as shall be just sufficient to chemically combine with all the acid of the original iron salt, leaving the iron free to combine with the vegetable acids. First, the iron; second, the mineral acid of its salts; third, the soda and other alkaline base present; fourth, the vegetable acids present, are consequently all chemically equivalent proportions to each other.

As an example, we will describe the process of making the soluble black from the refuse of one of our tanning operations, merely premising that it is impossible to give quantities that will be right for all spent tan materials, as these differ very widely both as they are formed originally of different materials and as the processes they have undergone are different. To every eighty thousand gallons of spent tan-liquor of, say, 2½° Twaddle dissolve one hundredweight of caustic soda of 65° to 70° purity. Then any sediment is separated by decantation or filtering through some spent bark or other suitable filter, and then with constant stirring by any suitable means evaporate quickly down to 56° Twaddle. When spent solids are treated, we dissolve one hundredweight of caustic in a quantity of spent liquor that will well cover the spent solids used, and in a suitable vessel heat the whole with steam for several hours, according to quality of refuse matter. The amount of refuse tan solids this one hundred-weight of soda would act on varies very much. One hundred-weight of caustic would be sufficient for ten (10) tons in some cases, and about two tons in others. The liquor is then drained off and the residue washed with spent water or tan-liquor that has or has not had its portion of caustic, and the whole boiled down, as above. During evaporation the liquor is preferably thoroughly exposed to the air by any suitable means, such as blowing air through it.

We claim as our invention—

The process of making soluble or finely-divided black material from waste tan-liquor or tanning materials by extracting the gallic acid by means of alkali, concentrating, and adding a soluble salt of iron, substantially as described.

In testimony whereof we have signed our names to this specification in the presence of two subscribing witnesses.

THOMAS WADE APPLEYARD, JR.
WALTER KNAPP APPLEYARD.
JAMES LONGSHAW.

Witnesses to the signatures of Thomas Wade Appleyard, Jr., and Walter Knapp Appleyard:

JOHN LOWE,
EDWARD WHITELEY.

Witnesses to the signature of James Longshaw:

JNO. WHITMORE,
ROBERT WARDLE.